United States Patent [19]
Okumura et al.

[11] Patent Number: 5,701,225
[45] Date of Patent: Dec. 23, 1997

[54] TAPE CASSETTE HAVING A MINIMIZED CLAMP SET

[75] Inventors: Hideki Okumura, Neyagawa; Kazunori Sakamoto, Katano; Kiyoshi Kobata, Takatsuki; Kazunori Kubota, Neyagawa, all of Japan

[73] Assignee: Matsushita Electric Industrial Co., Ltd., Osaka, Japan

[21] Appl. No.: 467,823

[22] Filed: Jun. 6, 1995

[30] Foreign Application Priority Data

Jun. 17, 1994 [JP] Japan .................. 6-135619

[51] Int. Cl.$^6$ .................................................. G11B 23/20
[52] U.S. Cl. .................................. 360/132; 242/345
[58] Field of Search ........................ 360/85, 95, 132; 242/345, 347

[56] References Cited

U.S. PATENT DOCUMENTS

| | | | |
|---|---|---|---|
| 3,797,777 | 3/1974 | Hosono et al. | 242/346 |
| 3,856,228 | 12/1974 | Hosono et al. | 242/580.1 |
| 4,091,168 | 5/1978 | Kawamata | 360/85 |
| 4,136,843 | 1/1979 | Gourley | 242/338.3 |
| 4,754,358 | 6/1988 | Oishi | 242/345 |
| 4,765,563 | 8/1988 | Satoyoshi et al. | 242/345 |
| 4,889,296 | 12/1989 | Watanabe et al. | 242/347 |
| 5,002,238 | 3/1991 | Hirayama | 242/345 |
| 5,417,379 | 5/1995 | Gelardi et al. | 242/347 |

FOREIGN PATENT DOCUMENTS

| | | |
|---|---|---|
| 62-61079 | 4/1987 | Japan . |
| 62-61082 | 4/1987 | Japan . |
| 1-140614 | 9/1989 | Japan . |
| 2-42276 | 3/1990 | Japan . |
| 2-80386 | 6/1990 | Japan . |
| 3-269888 | 12/1991 | Japan . |
| 4-67378 | 3/1992 | Japan . |
| 5-109234 | 4/1993 | Japan . |

*Primary Examiner*—Jefferson Evans
*Attorney, Agent, or Firm*—Wenderoth, Lind & Ponack

[57] ABSTRACT

A tape cassette has a pair of reels each including a reel hub, with each hub having an anchor groove defined in an outer peripheral surface thereof so as to extend in a lengthwise direction thereof. A generally elongated clamping piece is received within the anchor groove and has a predetermined width as measured circumferentially of the reel hub. A tape medium includes a length of magnetic recording tape having opposite ends, and a leader tape connected with each of the opposite ends of the length of magnetic recording tape by of a splicing tape of a predetermined length. One end of the leader tape remote from the length of magnetic recording tape is received within the reel hub and anchored to the reel hub with the clamping piece snapped into the anchor groove. The splicing tape is, when the tape medium is wound around the reel hub, positioned immediately radially outwardly of and encompassing the predetermined width of the clamping piece.

5 Claims, 4 Drawing Sheets b > a

TAPE CASSETTE HAVING A MINIMIZED CLAMP SET

BACKGROUND OF THE INVENTION 1. (Field of the Invention)

The present invention generally relates to a tape cassette accommodating therein a length of audio and/or video recording tape and, more particularly, to reels used in the tape cassette for anchoring opposite ends of the length of recording tape.

2. (Description of the Prior Art)

A tape cassette accommodating therein a length of audio and/or video recording tape, particularly a length of digital audio recording tape, comprises a generally box-like housing and first and second reels rotatably housed within the housing and spaced apart from each other. The length of recording tape has its opposite ends connected to the respective reels with a portion of the recording tape between the opposite ends being wound around the reels. The reels are generally of an identical construction and each includes a generally cylindrical hub having its opposite ends formed with radially outwardly protruding reel flanges.

In general, connection between each end of the length of recording tape with the associated reel is carried out by the use of a respective length of leader tape. The leader tape in turn has one end non-detachably connected with the length of recording tape by the use of an elongated splicing member of a width substantially equal to that of the recording tape and the opposite end fixedly connected to the reel hub. This will now be discussed in detail with reference to FIG. 2.

FIG. 2 illustrates a sectional representation of a reel hub 1 of a substantially cylindrical configuration taken along a line perpendicular to the longitudinal axis of the reel hub 1. The reel hub 1 has a longitudinal anchor groove 1a defined therein so as to extend lengthwise thereof and radially inwardly depressed to receive a generally elongated clamping piece 2 of a shape complemental to the shape of the anchor groove 1a. A tape medium includes a length of magnetic recording tape 5 having its opposite ends connected with a leader tape 3 by means of a splicing tape 4. An inner end of the leader tape 3 on each end of the length of magnetic recording tape 5 is received within the anchor groove 1a and fixed in position by the clamping piece 2 snapped into such anchor groove 1a to thereby accomplish securement of the leader tape 3 to the hub 1.

With the inner end of the leader tape 3 so secured to the hub 1, the leader tape 3 emerges outwardly from the anchor groove 1a through a minute nipping gap between one longitudinal side edge of the clamping piece 2 and one longitudinal edge of the anchor groove 1a adjoining the one longitudinal side edge of the clamping piece 2 before it is turned in one direction around the hub 1 to thereby form a tape roll on the corresponding reel. The leader tape 3 is, therefore, acutely bent at that very portion thereof which emerges outwardly through that minute nipping gap in the hub 1, and is then turned in one direction around the hub 1, thereby leaving a rise as at 3a that may be considered a surface line protuberance present on an outer peripheral surface of the hub 1. This rise 3a in turn leaves a surface indentation on one side of that portion of the leader tape 3 opposite to the direction in which the leader tape 3 is turned immediately after having emerged outwardly through the minute nipping gap in the hub 1.

On the other hand, as is well known to those skilled in the art, the tape medium in the tape cassette, when in use, travels at a relatively high speed from a first reel to a second reel, having been drawn from a roll of tape around the hub of the first reel while forming a roll of tape of an increasing diameter around the hub of the second reel. However, before the tape cassette is first used for information recording or playback on or from the length of magnetic recording tape 5, the tape medium may reside tightly wound around one of the reels for a substantial period of time and under varying conditions of temperature and humidity. A similar condition may occur when the tape cassette that is always used for information recording or playback is not used for a substantial period of time, in which condition the tape medium may reside tightly wound in part around the hub of the first reel and in part around the hub of the second reel, or in its entirety around the hub of one of the reels.

Considering a single reel having a roll of the tape medium tightly wound around the hub thereof, some of the turns of the tape medium around and adjacent to the hub take a so-called "clamp set", the phenomenon in which a surface indentation caused by the rise 3a of the leader tape 3 as discussed above leaves a corrugated marking on a portion of each of some innermost tape turns of the roll which comes into alignment with the rise 3a in the hub. This is particularly true where the roll of tape, tightly wound around the hub is kept, or allowed to stand, for a substantial period of time under a high-temperature and/or in a high-humidity environment. Once the tape medium takes the clamp set, the tape medium, when viewed as developed straight and flat, has an end portion thereof adjacent the hub presenting a series of corrugated markings set therein at generally regular intervals corresponding to the length of each tape turn.

While the leader tape 3, as well as the splicing tape 4 and the clamping piece 2, has a length fixed with a certain tolerance according to the standards stipulated for a particular type of the tape cassette, the leader tape 3 is generally of a length sufficient for it to be wound in a few turns around the hub. Therefore, not only the tape leader 3, but also a substantial length of the inner end portion of the length of magnetic recording tape 5, are set with the corrugated markings.

The presence of the clamp set, that is, the presence of the corrugated markings, is highly problematic in the case where the length of magnetic recording tape 5 is of a kind known as a digital audio tape (DAT) and a digital compact cassette tape (DCC) and is used for digital information recording or playback. This is because, each time those portions of the length of magnetic recording tape 5 where the corrugated markings are left move past an information recording and/or reproducing head, the head-to-tape spacing fluctuates, resulting in the occurrence of a signal drop-out and/or an increase in the error rate. Once this occurs, information such as, for example, music, recorded on the magnetic tape would be unpleasant to listen to.

In order to substantially avoid or minimize the clamp set occurring in the tape medium, various attempts have hitherto been suggested. By way of example, Japanese Laid-open Utility Model Publication No. 62-61079, published Apr. 15, 1987, discloses a connection between the length of magnetic recording tape and the cleaning tape connected together by the use of a splicing tape which is in turn accommodated together with a turn of the cleaning tape immediately therebelow within a longitudinal groove defined in the hub.

Japanese Laid-open Utility Model Publication No. 62-61082, published Apr. 15, 1987, discloses the use of a complicatedly shaped clamping piece having an outer curved surface which, when the clamping piece is received in the complementally shaped anchor groove in the hub to clamp one end of a leader tape or a cleaning tape, is set back radially inwardly of the hub to accommodate the thickness of the splicing tape used to connect the leader tape or cleaning tape with the length of magnetic recording tape. In this publication, the splicing tape is shown to have a length substantially equal to the width of the clamping piece as measured in a direction circumferentially of the hub.

Japanese Laid-open Utility Model Publication No. 1-140614, published Sep. 26, 1989, discloses the leader tape and the length of magnetic recording tape connected in end-to-end abutting relationship by the use of an adhesive tape of a length corresponding to the circumference of the hub. No reference to the connection between the tape leader and the hub is made in this publication. It is pointed out that the adhesive tape used in this publication is too long to satisfy the standards.

Japanese Laid-open Utility Model Publication No. 2-42276, published Mar. 23, 1990, disclose the use of leader tape wound a number of turns around the hub with at least a generally intermediate portion of the leader tape bonded by the use of an adhesive material to the preceding turn of the leader tape.

Japanese Laid-open Utility Model Publication No. 2-80386, published Jun. 20, 1990, discloses the use of the leader tape wound in one or more turns around the hub with the overlapping turns of the leader tape being connected with each other by the use of at least one piece of double-sided adhesive tape.

Japanese Laid-open Patent Publication No. 3-269888, published Dec. 2, 1991, discloses the use of a clamping piece having a thickness reduced a quantity corresponding to the thickness of the leader tape so that an outer curved surface of the clamping piece, when received in the anchor groove in the hub, may be set back radially inwardly of the outer periphery of the hub.

Japanese Laid-open Patent Publication No. 4-67378, published Mar. 3, 1992, discloses a connection between the leader tape and the length of magnetic recording tape by the use of splicing tape. The splicing tape used therein is chosen to have such a length that the tape medium is turned around the hub, and the splicing tape is positioned above and encompassed within the width of the clamping piece. This publication also discloses the clamping piece having a thickness reduced a quantity corresponding to the thickness of the leader tape so that an outer curved surface of the clamping piece, when received in the anchor groove in the hub may be set back radially inwardly of the outer periphery of the hub to accommodate the thickness of the splicing tape.

Japanese Laid-open Patent Publication No. 5-109234, published Apr. 30, 1993, discloses the use of splicing tape of a length determined in consideration of the circumference of the hub so that, when the tape medium is turned around the hub, opposite ends of the splicing tape may not overlap with each other, but may assume respective positions close to each other. It is, however, pointed out that the splicing tape used in this publication is too long to satisfy the standards.

Other publications of particular interest include U.S. Pat. Nos. 3,856,228, 4,136,843, and 3,797,777, all related to the tape reel, but not aimed at minimizing the clamp set occurring in the tape medium.

All those approaches have been unsatisfactory in minimizing the clamp set. Specifically, where the splicing tape of a length smaller than the width of the clamping piece is employed such as disclosed in the Japanese Laid-open Patent Publication No. 4-67378, an accurate positioning of the splicing tape during winding of the tape medium around the tape reel is required to allow it to be encompassed within the width of the clamping piece. This may easily be accomplished during a laboratory experiment, but cannot be accomplished with no difficulty on a mass-production line. Once the splicing tape is displaced out of the width of the clamping piece, the clamp set is likely to occur.

SUMMARY OF THE INVENTION

Therefore, the present invention has for its essential object to provide an improved tape cassette wherein a reel hub has been designed to minimize or substantially eliminate the clamp set occurring in the tape cassette.

In order to accomplish this and other objects and features of the present invention, there is provided, in accordance with a broad aspect of the present invention, a tape cassette comprising a pair of reels each including a reel hub having an anchor groove defined in an outer peripheral surface thereof so as to extend in a direction lengthwise thereof, a generally elongated clamping piece received within the anchor groove and having a predetermined width as measured circumferentially of the reel hub, a tape medium including a length of magnetic recording tape having opposite ends, and a leader tape connected with each of the opposite ends of the length of magnetic recording tape by means of a splicing tape of a predetermined length, with one end of the leader tape remote from the length of magnetic recording tape being received within the reel hub and anchored to the reel hub with the clamping piece snapped into the anchor groove. The splicing tape is, when the tape medium is wound around the reel hub, positioned immediately radially outwardly of and encompassing the predetermined width of the clamping piece.

According to the present invention, the thickness of the splicing tape fills up the surface indentation formed by the presence of the rise created by the leader tape emerging outwardly through the nipping gap between one longitudinal side edge of the clamping piece and one longitudinal edge of the anchor groove in the reel hub. Because of this, formation of the clamp set as defined above is minimized and, therefore, the rate of possibility of error which would deteriorate when the tape cassette is allowed to stand under severe conditions of high temperature and high humidity, is advantageously minimized.

In particular, the selection of the length of the splicing tape sufficient to encompass the width of the clamping piece, that is, to a value greater than the width of the clamping piece, makes it possible that the splicing tape, even though slightly displaced relative to the clamping piece in a direction circumferentially of the reel hub, covers the clamping piece at all times so long as the tape medium is wound around the reel hub to form a tape roll. This feature permits the tape cassette to be mass-produced.

The tape cassette to which the present invention is applicable may be any known tape cassette, such as, for example, that for accommodating a length of audio recording tape, but the present invention is particularly advantageously applied to an audio tape cassette of a type which the standards allow the splicing tape to have a length sufficiently greater than the width of the clamping piece.

Considering that in a tape cassette for use with a digital information recording and/or reproducing apparatus such as, for example, DCC or DAT device, the presence of the clamp set is highly problematic, because it brings about deterioration of the SER (signal error rate) which results in reproduction of information unpleasant to listen to and which may therefore reduce the quality of the tape cassette, the present invention has a significant utility.

As is well know to those skilled in the art, the clamp set is particularly considerable and, hence, deterioration of the SER is considerable, where the tape medium has a relatively small thickness. However, with the tape cassette wherein the splicing tape is positioned immediately radially outwardly of and encompassing the width of the clamping piece in accordance with the present invention, the occurrence of the clamp set in tape medium having a thickness of not greater than 10 μm for long-hour recording or playback is also advantageously minimized.

Although the use of the splicing tape in the form of any known nonmagnetic polymer film deposited on one surface thereof with an adhesive material may be satisfactory in minimizing the clamp set, the use of the splicing tape in the form of a non-magnetic polymer film having a metal thin-film deposited on one surface thereof by the use of any known vacuum deposition technique and also having an adhesive layer formed thereon may preferably be used to enhance minimization of the clamp set.

Alternatively, as is the case with the splicing tape having the metallic thin-film formed on the surface thereof, the leader tape may preferably be in the form of a non-magnetic polymer film deposited on one surface thereof with a metal thin-film by the use of any known vacuum deposition technique.

BRIEF DESCRIPTION OF THE DRAWINGS

This and other objects and features of the present invention will become clear from the following description taken in conjunction with a preferred embodiment thereof with reference to the accompanying drawings, in which like parts are designated by like reference numerals and in which.

DETAILED DESCRIPTION OF THE EMBODIMENT

Figure 1:
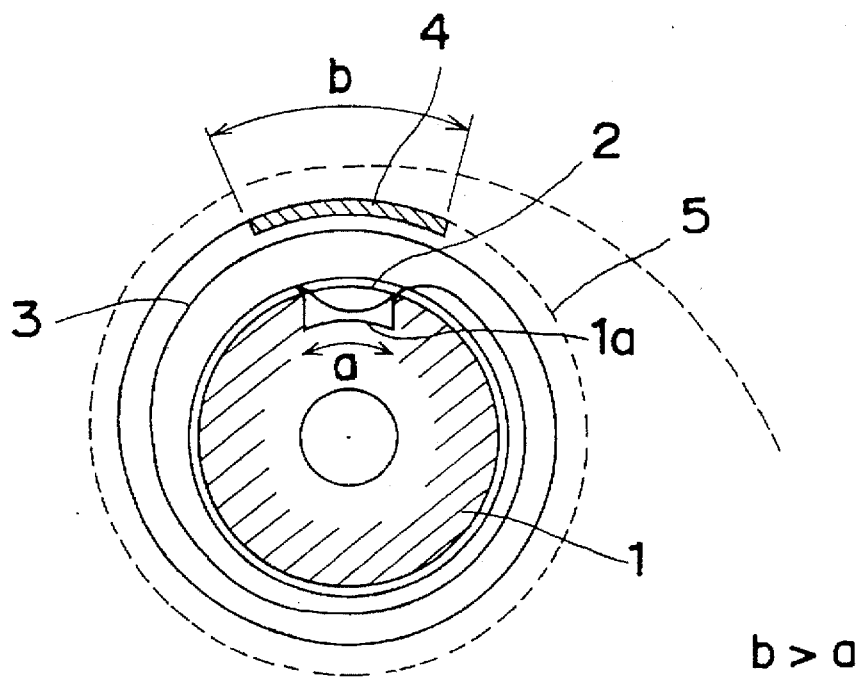
FIG. 1 is a schematic transverse sectional view of a hub used in a tape reel, showing a tape medium wound therearound according to the present invention.
Figure 2:
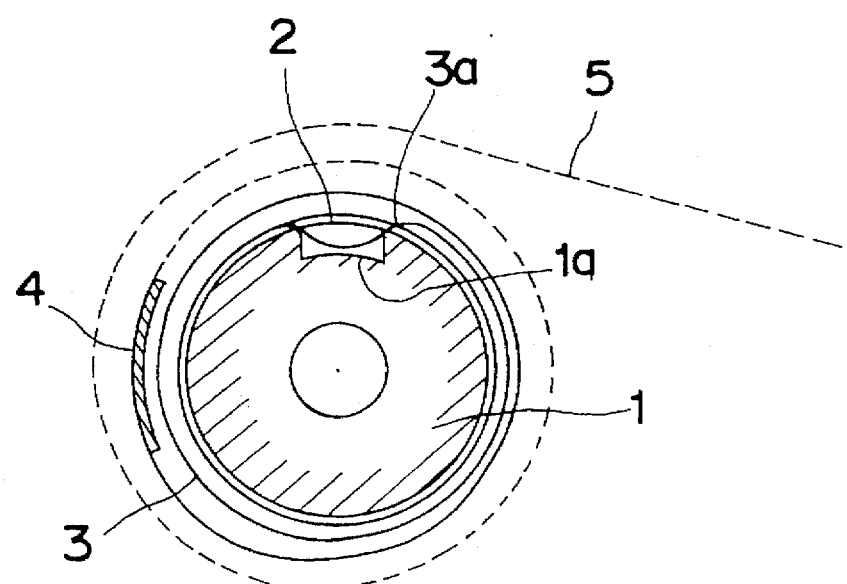
FIG. 2 is a view similar to FIG. 1, showing the prior art tape reel.

Referring to FIG. 1, a reel hub 1 shown therein may be of a structure identical with that shown in FIG. 2. As is the case with the prior art shown in and described with reference to FIG. 2, the tape medium wound around the reel hub 1 includes a length of magnetic recording tape 5 having its opposite ends connected with a leader tape 3 by means of a splicing tape 4. An inner end of the leader tape 3 on each end of the length of magnetic recording tape 5 is received within a anchor groove 1a and fixed in position by the clamping piece 2 snapped into such anchor groove 1a to thereby accomplish securement of the leader tape 3 to the reel hub 1. The leader tape 3 employed in the practice of the present invention has a length so chosen that, when the tape medium resides tightly wound around the reel hub 1, the splicing tape 4 having a length b greater than the width a of the clamping piece 2 is brought above and encompasses the width of the clamping piece 2. As can also be seen from FIG. 1, the length of the splicing tape 4 is less than one half of the circumference of the reel hub 1.

According to the standardized specification of a digital compact cassette (DCC) tape, the reel hub 1 shall be 20 mm in outer diameter, the clamping piece 2 shall be 9 mm in width as measured in a direction circumferentially of the reel hub 1, the splicing tape 4 shall be 10 μm in thickness and 16 mm in length, the leader tape 3 shall be 15 μm in thickness, and the length of magnetic recording tape 5 shall be 13 μm in thickness. Under these circumstances, the leader tape 3 employed in the practice of the present invention has a length chosen according to the following formula.

Hub Outer Diameter×π×6 turns×Width of Clamping Piece/2, wherein π represents the ratio of the circumference of the reel hub 1 to the outer diameter thereof.

Applying this formula to the standardized specification of the digital compact cassette tape results in the leader tape 3 having a length of 372 mm. In other words, assuming that the reel hub 1 employed in the practice of the present invention has an outer diameter of 20 mm with the clamping piece 2 of 9 mm in width used to anchor one end of the leader tape 3 of 15 μm in thickness thereto, the splicing tape 4 of 10 μm in thickness and 16 mm in length used to connect the leader tape 3 and the length of magnetic recording tape 5 of 13 μm in thickness together can be brought to a position radially outwardly of, and encompassing the width of, the clamping piece 2 when the such leader tape 3 having a length of 372 mm is wound in six turns around the reel hub 1.

Hereinafter, the present invention will be demonstrated by way of examples.

EXAMPLE 1

The commercially available DCC tape ("RT-D90" manufactured by the assignee of the present invention) of 3.78 mm in width, 12.5 μm in thickness and 134 mm in length was wound on the reel hub together with the splicing tape so positioned relative to the clamping piece as shown in FIG. 1 in accordance with the present invention. The tape medium so prepared was wound around the reel hub by the use of a commercially available tape deck ("RS-DC" manufactured by the assignee of the present invention) having been operated under a "PLAY" mode. The tape cassette was then allowed to stand for 6 hours under a temperature of 70° C. and a relative humidity of 20% and, thereafter, the SER (signal error rate) was measured using a commercially available error rate measuring apparatus ("DEMS 2000" manufactured by Philips, Japan. During the SER measurement, the signal recorded on an end portion of the B-side of the DCC tape adjacent the reel hub (which end portion is referred to as "B-Top") and that on an end portion of the A-side of the DCC tape adjacent the same reel hub (which end portion is referred to as "A-End") were reproduced for five minutes.

EXAMPLE 2

A similar SER measurement of the signals on the B-Top and A-End of the DCC tape was carried out under the same conditions as in Example I, using the tape cassette similar to that used in Example I, except that the splicing tape was and which signifies that, although information reproduced is not unpleasant to listen to, an increased number of the frames may lead to reproduction of information unpleasant to listen to.

TABLE

| | B-Top | | | | | | A-End | | | | | |
|---|---|---|---|---|---|---|---|---|---|---|---|---|
| | Before | | | After | | | Before | | | After | | |
| | SER | CF | C2HF | SER | CF | C2HF | SER | CF | C2HF | SER | CF | C2HF |
| Ex. 1 | 0.54 | 0 | 0 | 3.02 | 10 | 0 | 0.38 | 0 | 0 | 2.92 | 12 | 0 |
| Ex. 2 | 0.37 | 0 | 0 | 1.71 | 5 | 0 | 0.41 | 1 | 0 | 1.86 | 6 | 0 |
| Ex. 3 | 0.27 | 0 | 0 | 2.71 | 7 | 0 | 0.50 | 1 | 0 | 2.16 | 8 | 0 |
| Ex. 4 | 0.18 | 1 | 0 | 3.35 | 13 | 0 | 0.27 | 0 | 0 | 3.05 | 18 | 0 |
| Com. 1 | 0.29 | 0 | 0 | 55.28 | 173 | 6 | 0.65 | 1 | 0 | 46.43 | 162 | 0 |
| Com. 2 | 0.61 | 0 | 0 | 29.88 | 145 | 4 | 0.39 | 1 | 0 | 32.91 | 158 | 0 | made up of a non-magnetic tape base of a polymer film having aluminum deposited thereon to a thickness of about 500 angstrom.

EXAMPLE 3

A similar SER measurement of the signals on the B-Top and A-End of the DCC tape was carried out under the same conditions as in Example I, using a tape cassette similar to that used in Example I, except that the leader tape was made up of a non-magnetic tape base of a polymer film having aluminum deposited thereon to a thickness of about 500 angstrom.

EXAMPLE 4

A similar SER measurement of the signals on the B-Top and A-End of the DCC tape was carried out under the same conditions as in Example I, using the tape cassette similar to that used in Example I, except that the DCC tape used had a thickness of 9.5 μm.

Comparison 1

A similar SER measurement of the signals on the B-Top and A-End of the DCC tape was carried out under the same conditions as in Example I, using a tape cassette in which the splicing tape was so positioned and so displaced relative to the clamping piece as shown in FIG. 2.

Comparison 2

A similar SER measurement of the signals on the B-Top and A-End of the DCC tape was carried out under the same conditions as in Example I, using a tape cassette in which the splicing tape had a length smaller than the width of the clamping piece.

The following table illustrates the average SER (SERs on B-Top and A-End divided by 2), CF (Critical Frame Number) and C2HF (C2 Hard Flag Number) measured before and after each of the tape cassettes under Examples I to IV and Comparisons I and II was allowed to stand under the specified conditions. The legends "Before" and "After" used in the table stands for before and after each of the tape cassettes under Examples I to IV and Comparisons I and II was allowed to stand under the specified conditions.

In the table, "C2HF" means an occurrence of errors which cannot be corrected and which constitute a cause of information unpleasant to listen to. "CF" means the number of frames in which errors that can be corrected have occurred As shown in the foregoing table, the positioning of the splicing tape 4 of a length greater than the width of the clamping piece 2 so as to lie radially outwardly of and encompass the width of the clamping piece 2 when the tape medium has been wound around the reel hub 1 in accordance with the present invention brings about such advantages that, as exhibited by Examples 1 to 3 above, the SER is little affected, even after the tape cassette has been allowed to stand for a substantial length of time under severe conditions of high temperature and high humidity, the CF is small and no signal drop-out (C2HF) critical to the quality of the tape occur. While the present invention satisfactorily works, the use of the splicing tape deposited with the aluminum layer such as in Example 2 or the leader tape deposited with the aluminum layer such as in Example 3 is more effective to minimize the clamp set. Also, even if the concept of the present invention is applied to the magnetic recording tape having a relatively small thickness not greater than 10 μm such as in Example, 4 for 120 minute information recording use, a favorable effect can be obtained.

On the other hand, where the splicing tape when the tape medium is wound around the reel hub, is displaced circumferentially relative to the clamping piece 2, such as in Comparison 1, or where, even though the splicing tape is radially aligned with the clamping piece 2, the splicing tape is of a length smaller than the width of the clamping piece, such as in Comparison 2, a considerable clamp set has been found after the tape cassette had been allowed to stand for a substantial length of time under severe conditions of high temperature and high humidity, resulting in a considerable increase in SER accompanying an increase of the C2HF that is liable to the information unpleasant to make listen to.

Figure 3A:
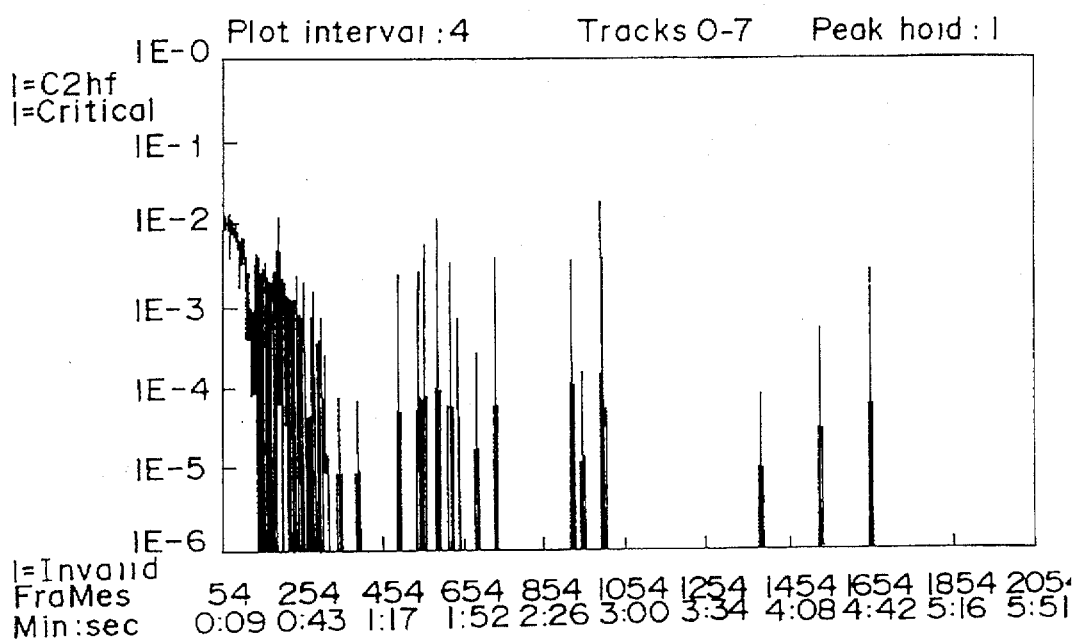
FIG. 3A is a graph showing an error rate measured for five minutes in a condition of elevated temperature during information playback from one of two recording sides of a length of magnetic recording tape wound around the tape reel according to the present invention.
Figure 3B:
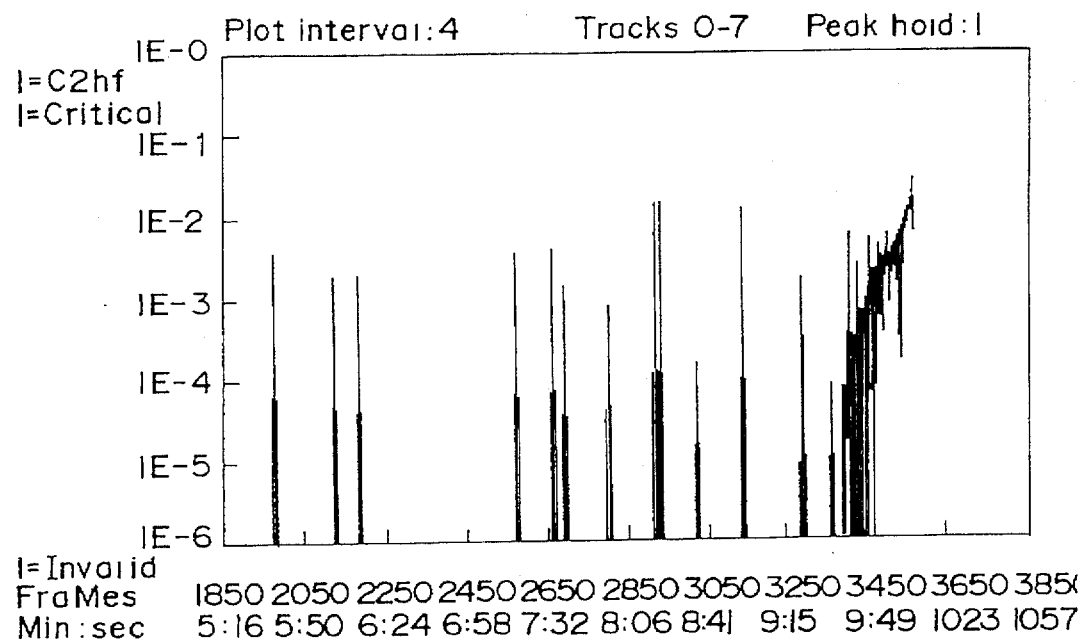
FIG. 3B is a graph showing an error rate measured for five minutes in the same condition during information playback from the other of the two recording sides of a length of magnetic recording tape.
Figure 4A:
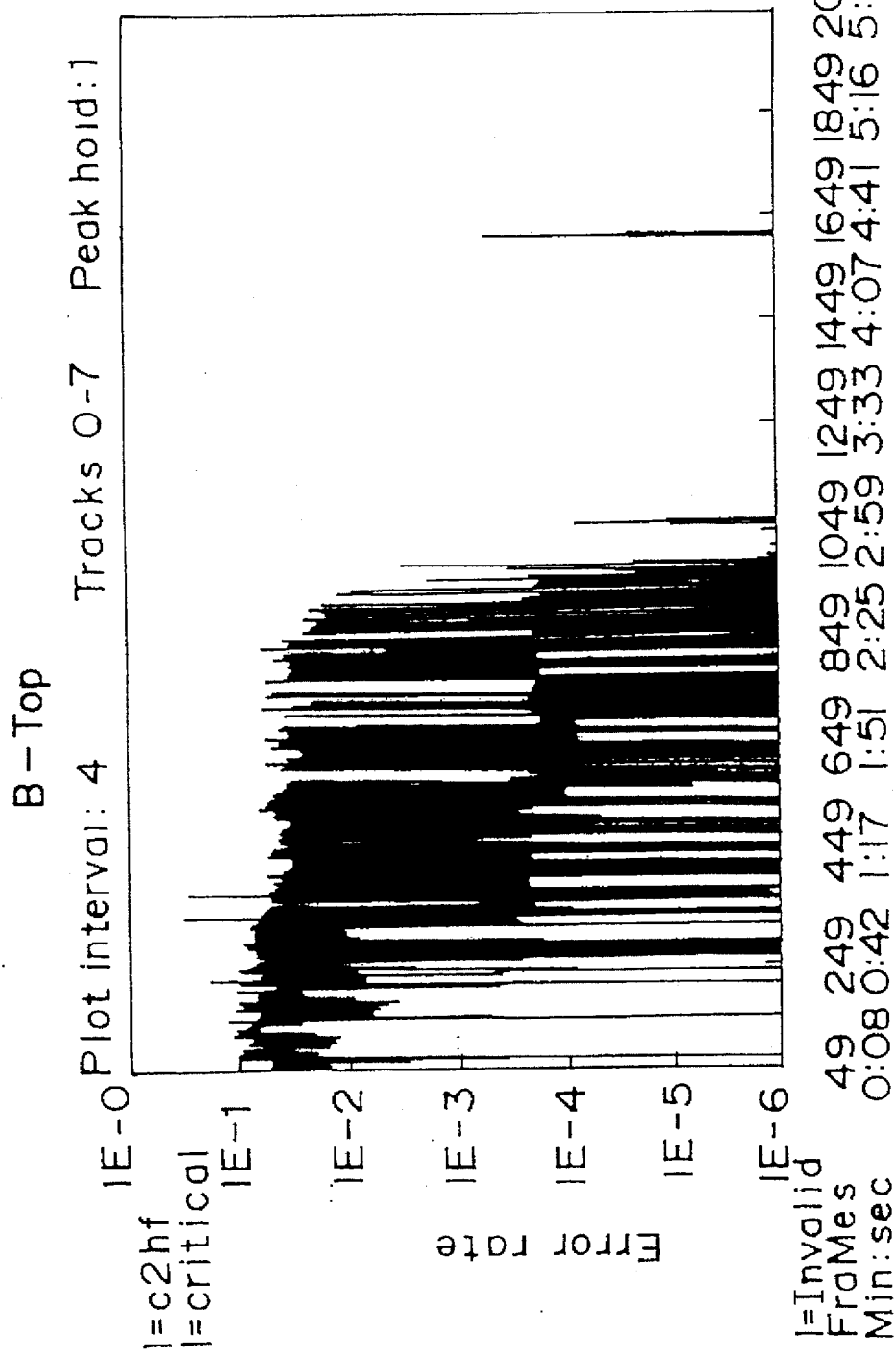
FIG. 4A is a graph showing an error rate measured for five minutes in a condition of elevated temperature during information playback from one of two recording sides of a length of magnetic recording tape.
Figure 4B:
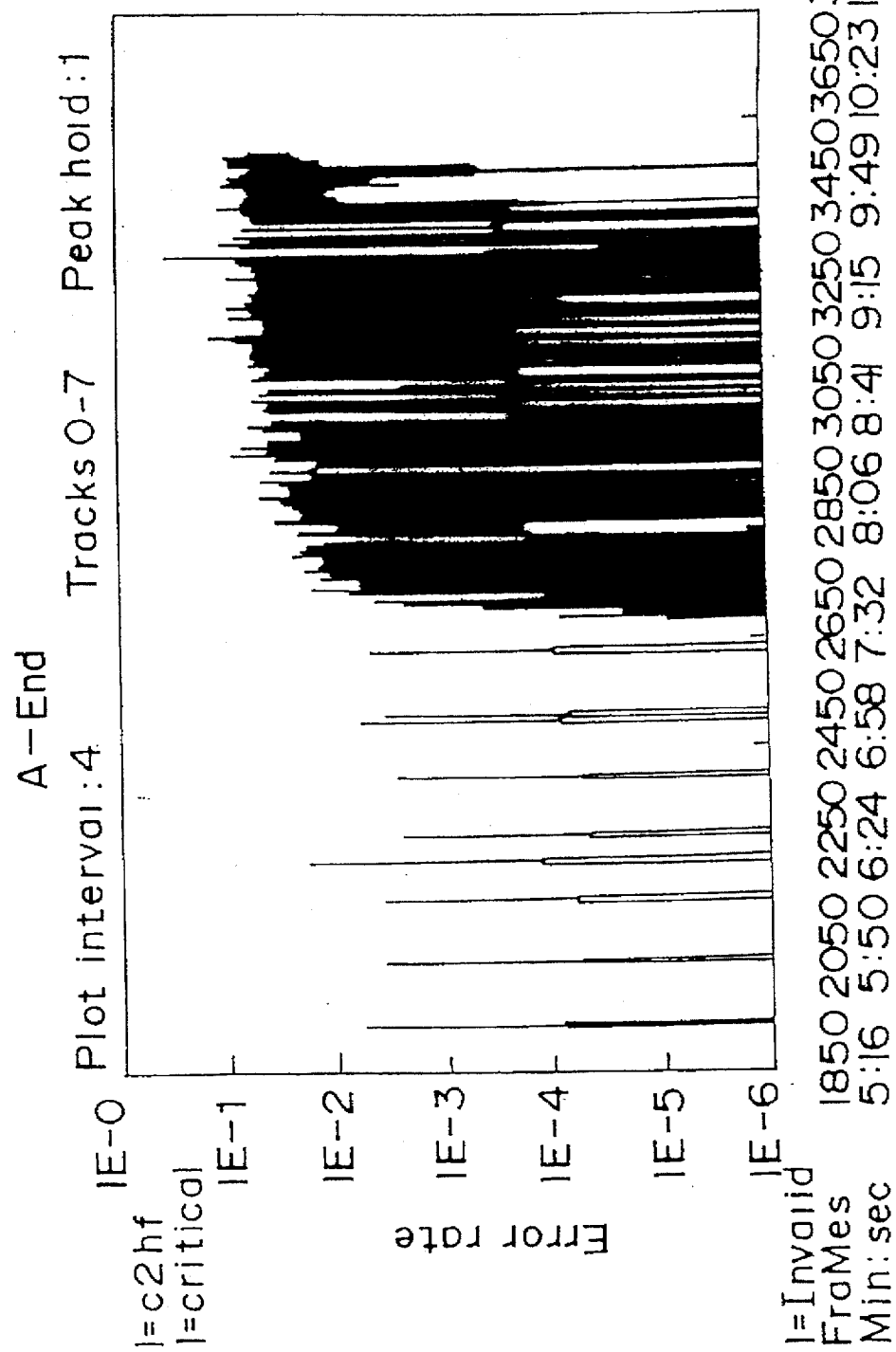
FIG. 4B is a graph showing an error rate measured for five minutes in the same condition during information playback from the other of the two recording sides of a length of magnetic recording tape.

FIGS. 3A and 3B and FIGS. 4A and 4B illustrate graphs showing error rates exhibited by the B-Top and A-End portions of the tape in the tape cassette embodying the present invention and those in the prior art tape cassette when the both were allowed to stand for six hours under a dry condition of 70° C. in temperature, respectively. In each of these figures, the C2Hf and the CF occurring frame number are shown in the top right portion. The measurement was carried out by running a B-side end portion of the tape medium adjacent the reel hub for five minutes and then by running an A-side end portion of the tape medium adjacent the reel hub for five minutes, i.e., for 10 minutes in total. As shown in FIGS. 4A and 4B, in the prior art tape cassette, clamp set has occurred considerably, with the SER ranging from 40 to 50E-4, accompanying an occurrence of the CF in unison with rotation of the reel hub. In the worst case, the C2HF has occurred resulting in playback of information unpleasant to listen to. In contrast thereto, as shown in FIGS. 3A and 3B, in the tape cassette embodying the present invention, the clamp set has been reduced with the SER ranging from 1 to 2E-4, accompanying reduction in frequency of occurrence of the CF and no C2HF has occurred.

Although the present invention has been described in connection with the preferred embodiments thereof and with reference to the accompanying drawings, it is to be noted that various changes and modifications will be apparent to those skilled in the art. For example, although in the foregoing description reference has been made to the use of aluminum for formation of a vapor-deposited metallic layer, Au, Ag or Pt may be equally employed in place of aluminum.

Therefore, such changes and modifications are to be understood as included within the scope of the present invention as defined by the appended claims, unless they depart therefrom.

What is claimed is:

1. A tape cassette, comprising:
   a pair of reels each including a reel hub, each said reel hub having an anchor groove defined in an outer peripheral surface thereof;
   an elongated clamping piece received within each said anchor groove, said elongated clamping piece having a predetermined width as measured circumferentially of said reel hub; and
   a tape medium that comprises a length of magnetic recording tape having opposite ends, each of said opposite ends having a leader tape connected therewith by a respective splicing tape having a predetermined length, said splicing tape being in the form of a nonmagnetic tape having a thin metal film deposited on a surface thereof, one end of each said leader tape that is remote from said length of magnetic recording tape being received within a respective said reel hub and anchored to the respective said reel hub by a respective said clamping piece received within the respective said anchor groove;
   wherein one said splicing tape is positioned, when said tape medium is wound around one said reel hub, at a position that is immediately radially outward of said clamping piece of the one said reel hub, the predetermined length of the one said splicing tape being greater than the predetermined width of said elongated clamping piece and less than one-half of the circumference of the one said reel hub.

2. The tape cassette as claimed in claim 1, wherein said leader tape is a non-magnetic tape having a thin metal film deposited on a surface thereof.

3. The tape cassette as claimed in claim 1, wherein said tape medium has a thickness not greater than 10 μm.

4. The tape cassette as claimed in claim 1, wherein said tape leader has a length selected according to the following formula:

$$OD \times \pi \times N \times W/2$$

wherein OD represents the outer diameter of said reel hub, π represents the ratio of the circumference of said reel hub to the outer diameter thereof, N represents the number of turns of the leader tape around said reel hub, and W represents the width of the clamping piece.

5. A tape cassette, comprising:
   a pair of reels each including a reel hub, each said reel hub having an anchor groove defined in an outer peripheral surface thereof;
   an elongated clamping piece received within each said anchor groove, said elongated clamping piece having a predetermined width as measured circumferentially of said reel hub; and
   a tape medium that comprises a length of magnetic recording tape having opposite ends, each of said opposite ends having a leader tape connected therewith by a respective splicing tape having a predetermined length, said splicing tape having opposite ends and being in the form of a nonmagnetic tape having a thin metal film deposited on a surface thereof, one end of each said leader tape that is remote from said length of magnetic recording tape being received within a said anchor groove of a respective said reel hub and anchored to the respective said reel hub by a respective said clamping piece received within the respective said anchor groove;
   wherein the predetermined length of each said splicing tape is longer than the predetermined width of a respective said elongated clamping piece and wherein one said splicing tape, when said tape medium is wound around one said reel hub, is at a position radially outward of the respective said clamping piece of the one said reel hub and such that the one said splicing tape has a circumferential arc that encompasses the circumferential arc of said elongated clamping piece with each of the opposite ends of the one said splicing tape extending further than the circumferential arc of said elongated clamping piece but less than one half of the circumference of the reel hub.

* * * * *